(12) United States Patent
Schmidt et al.

(10) Patent No.: US 9,228,656 B1
(45) Date of Patent: Jan. 5, 2016

(54) METHOD FOR OPERATING AN AUTOMATIC TRANSMISSION

(71) Applicant: ZF Friedrichshafen AG, Friedrichshafen (DE)

(72) Inventors: Andreas Schmidt, Bavendorf (DE); Ruben Cueppers, Wangen (DE); Max Trautwein, Kressbronn (DE)

(73) Assignee: ZF FRIEDRICHSHAFEN AG, Friedshafen (DE)

( * ) Notice: Subject to any disclaimer, the term of this patent is extended or adjusted under 35 U.S.C. 154(b) by 0 days.

(21) Appl. No.: 14/512,716

(22) Filed: Oct. 13, 2014

(51) Int. Cl.
*F16H 3/44* (2006.01)
*F16H 61/04* (2006.01)
*F16H 61/14* (2006.01)

(52) U.S. Cl.
CPC ........ *F16H 61/0403* (2013.01); *F16H 61/0437* (2013.01); *F16H 61/143* (2013.01); *F16H 2061/0455* (2013.01); *F16H 2061/146* (2013.01); *F16H 2200/0065* (2013.01)

(58) Field of Classification Search
None
See application file for complete search history.

(56) References Cited

U.S. PATENT DOCUMENTS 8,206,257 B2 * 6/2012 Gumpoltsberger et al. .. 475/288
8,500,601 B2 * 8/2013 Arnold et al. ................. 477/154

* cited by examiner

*Primary Examiner* — Dirk Wright
(74) *Attorney, Agent, or Firm* — Dority & Manning, P.A.

(57) ABSTRACT

A method for operating an automatic transmission is provided. The method includes synchronizing a first positive shifting element of the at least one positive shifting element with a first process, a second process or a third process depending upon an input speed and/or an output speed of the automatic transmission. The first process, the second process and the third process can provide smooth and/or satisfactory shifting of the first positive shifting element at various input speeds and output speeds of the automatic transmission.

19 Claims, 2 Drawing Sheets

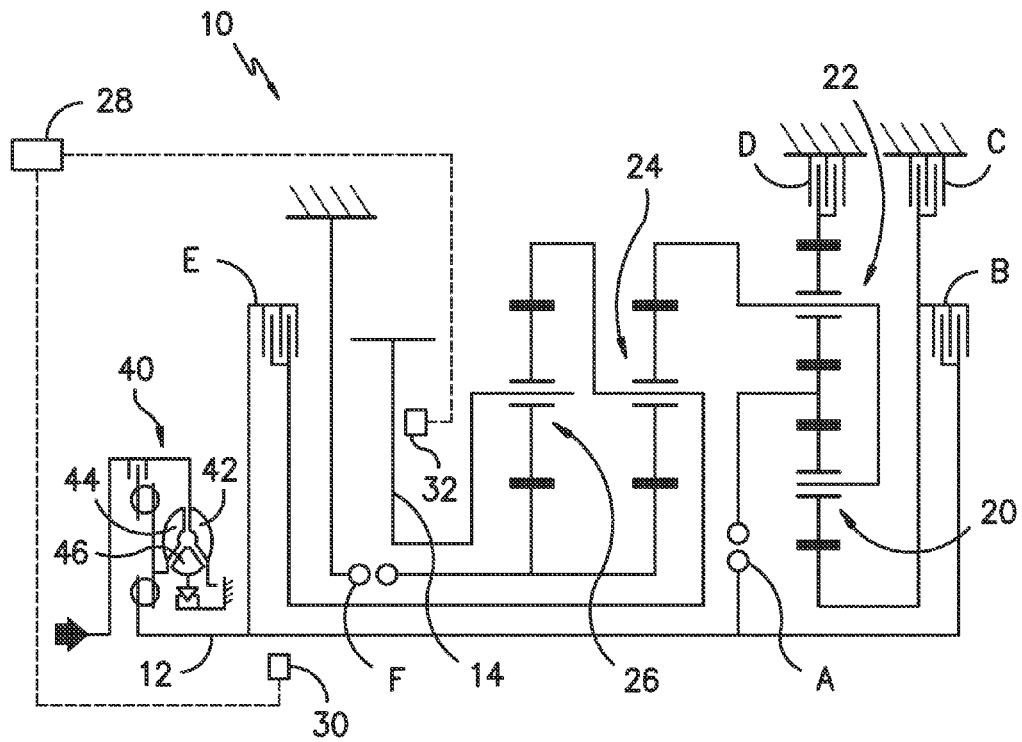
FIG. -1-
| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |
FIG. -2-

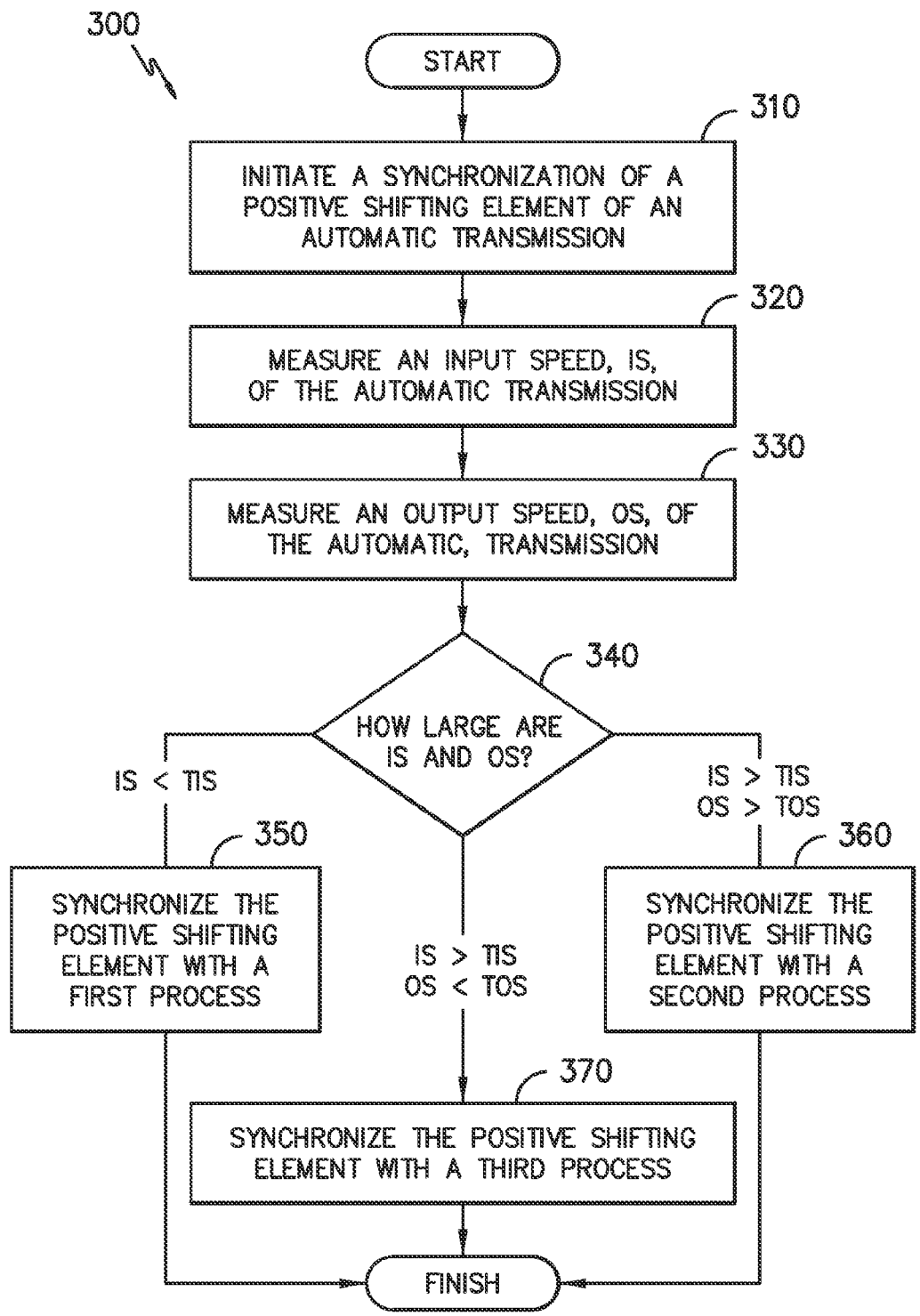
FIG. -3-

METHOD FOR OPERATING AN AUTOMATIC TRANSMISSION

FIELD OF THE INVENTION

The present subject matter relates generally to automatic transmissions, such as nine-speed automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Certain automatic transmissions include dog clutch shifting elements. During various gear shifts, the dog clutch is engaged or closed. Engaging the dog poses certain challenges. For example, the dog clutch is generally synchronized prior to engaging the dog clutch. When the dog clutch is synchronized, components of the dog clutch rotate at a common speed and may engage each other more easily. Conversely, such components may grind against each other and be damaged if the dog clutch is engaged while the dog clutch is not synchronized. However, synchronizing the dog clutch can be difficult and/or time consuming.

The automatic transmission may change gears and engage the dog clutch in a variety of circumstances. For example, when an associated vehicle is climbing a hill or rapidly accelerating, the automatic transmission may engage the dog clutch in order to downshift and change the gear ratio of the automatic transmission. As another example, the automatic transmission may engage the dog clutch when the vehicle is stopped or operating at a very slow speed in order to enter a forward gear or a reverse gear of the automatic transmission. Smoothly and/or quickly synchronizing and engaging the dog clutch when the associated vehicle is operating at such disparate speeds can be difficult.

Accordingly, a method for synchronizing a dog clutch of an automatic transmission would be useful. In particular, a method for synchronizing a dog clutch of an automatic transmission that also smoothly and/or quickly synchronizes the dog clutch in a variety of operating conditions would be useful.

BRIEF DESCRIPTION OF THE INVENTION

The present subject matter provides a method for operating an automatic transmission. The method includes synchronizing a first positive shifting element of the at least one positive shifting element with a first process, a second process or a third process depending upon an input speed and/or an output speed of the automatic transmission. The first process, the second process and the third process can provide smooth and/or satisfactory shifting of the first positive shifting element at various input speeds and output speeds of the automatic transmission. Additional aspects and advantages of the invention will be set forth in part in the following description, or may be apparent from the description, or may be learned through practice of the invention.

In a first exemplary embodiment, a method for operating an automatic transmission is provided. The automatic transmission has a plurality of non-positive shifting elements and at least one positive shifting element. The method includes measuring an input speed of the automatic transmission and an output speed of the automatic transmission and synchronizing a first positive shifting element of the at least one positive shifting element with: (1) a first process if the input speed of the automatic transmission is less than a criterion input speed at the step of measuring; (2) a second process if the input speed of the automatic transmission is greater than the criterion input speed at the step of measuring and the output speed of the automatic transmission is greater than a criterion output speed at the step of measuring; or (3) a third process if the input speed of the automatic transmission is greater than the criterion input speed at the step of measuring and the output speed of the automatic transmission is less than the criterion output speed at the step of measuring. The first process includes increasing the input speed of the automatic transmission via torque management. The second process includes shifting the automatic transmission to an initial gear and downshifting the automatic transmission to a subsequent gear after the step of shifting. The first positive shifting element of the at least one positive shifting element is commanded to a disengaged configuration in the initial gear. The first positive shifting element of the at least one positive shifting element is commanded to an engaged configuration in the subsequent gear. The third process includes closing a first non-positive shifting element of the plurality of non-positive shifting elements and actuating a second non-positive shifting element of the plurality of non-positive shifting elements to a touch point of the second non-positive shifting element.

In a second exemplary embodiment, a method for operating a nine-speed automatic transmission is provided. The nine-speed automatic transmission includes a friction shifting element C, a friction shifting element D, and a dog clutch F. The method includes measuring an input speed of the automatic transmission and an output speed of the automatic transmission and synchronizing the dog clutch F with: (1) a first process if the input speed of the automatic transmission is less than a criterion input speed at the step of measuring; (2) a second process if the input speed of the automatic transmission is greater than the criterion input speed at the step of measuring and the output speed of the automatic transmission is greater than a criterion output speed at the step of measuring; or (3) a third process if the input speed of the automatic transmission is greater than the criterion input speed at the step of measuring and the output speed of the automatic transmission is less than the criterion output speed at the step of measuring. The first process includes increasing the input speed of the automatic transmission via torque management. The second process includes shifting the automatic transmission to an initial gear and downshifting the automatic transmission to a subsequent gear after the step of shifting. The dog clutch F is commanded to a disengaged configuration in the initial gear. The dog clutch F is commanded to an engaged configuration in the subsequent gear. The third process includes closing the friction shifting element C and actuating the friction shifting element D to a touch point of the friction shifting element D.

In a third exemplary embodiment, a method for operating an automatic transmission is provided. The automatic transmission has a plurality of non-positive shifting elements and at least one positive shifting element. The method includes measuring an input speed of the automatic transmission and an output speed of the automatic transmission. The method also includes step for synchronizing a first positive shifting element of the at least one positive shifting element if the input speed of the automatic transmission is less than a criterion input speed at the step of measuring. The method further includes step for synchronizing the first positive shifting element of the at least one positive shifting element if the input speed of the automatic transmission is greater than the criterion input speed at the step of measuring and the output speed of the automatic transmission is greater than a criterion output speed at the step of measuring. The method additionally includes step for synchronizing the first positive shifting element of the at least one positive shifting element if the input speed of the automatic transmission is greater than the criterion input speed at the step of measuring and the output speed of the automatic transmission is less than the criterion output speed at the step of measuring.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of an automatic transmission according to an exemplary embodiment of the present subject matter.

FIG. 2 illustrates a table of an exemplary shifting scheme as may be used with the exemplary automatic transmission of FIG. 1.

FIG. 3 illustrates a method for operating an automatic transmission according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Automatic transmission 10 also includes a torque converter 40 with an impeller 42, a turbine 44 and a stator 46. Torque converter 40 may couple automatic transmission 10 to a motor of an associated vehicle. In particular, input shaft 12 may be coupled to turbine 44 of torque converter 40, and the motor may rotate impeller 42 relative to turbine 44 in order to urge or induce rotation of turbine 44 with oil flow between impeller 42 and turbine 44. In such a manner, torque converter 40 may couple an engine to automatic transmission 10 such that input shaft 12 is rotatable with the motor. Stator 46 may redirect oil flow from turbine 44 towards impeller 42 in order to improve performance of torque converter 40, as will be understood by those skilled in the art. Torque converter 40 may also include a one-way clutch to further improve performance of torque converter 40. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or impeller 44 of torque converter 40. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

FIG. 3 illustrates a method 300 for operating an automatic transmission according to an exemplary embodiment of the present subject matter. Method 300 may be used in or with any suitable transmission. For example, method 300 may be used with automatic transmission 10 (FIG. 1). The electronic control unit 28 of automatic transmission 10 may be programmed or configured to implement method 300. Utilizing method 300, synchronization of a positive shifting element of automatic transmission 10 may be improved or enhanced, e.g., such that the positive shifting element actuates to the engaged configuration smoothly and/or quickly.

At step 310, a synchronization of a positive shifting element of automatic transmission 10 is initiated or started, e.g., while an associated vehicle is moving. As an example, a synchronization of dog clutch A or dog clutch F may be initiated or started at step 310. During the synchronization, components of dog clutch A or dog clutch F may be brought to or towards a common rotational speed in order to permit actuation of dog clutch A or dog clutch F from the disengaged configuration to the engaged configuration. Thus, a speed differential of dog clutch A or dog clutch F decreases during the synchronization in order to permit actuation of dog clutch A or dog clutch F from the disengaged configuration to the engaged configuration. As discussed in greater detail below, method 300 includes various processes for synchronizing dog clutch A or dog clutch F depending upon the input speed and/or output speed of automatic transmission 10.

At step 320, an input speed, IS, of automatic transmission 10 is measured. As an example, electronic control unit 28 may receive speed measurements of input shaft 12 from input speed sensor 30 to measure the input speed IS of automatic transmission 10 at step 320. As another example, input speed sensor 30 may be positioned at or adjacent turbine 44 of torque converter 40 such that electronic control unit 28 receives speed measurements of turbine 44 from input speed sensor 30 to measure the input speed IS of automatic transmission 10 at step 320. At step 330, an output speed, OS, of automatic transmission 10 is measured. As an example, electronic control unit 28 may receive speed measurements of output shaft 14 from output speed sensor 32 to measure the output speed OS of automatic transmission 10 at step 330.

As discussed above, various processes are available for synchronizing the positive shifting element of automatic transmission 10, such as dog clutch F, while an associated vehicle is moving. In particular, each process of the various processes may be utilized when automatic transmission 10 is operating within certain parameters, e.g., when the input speed IS of automatic transmission 10 and/or the output speed OS of automatic transmission 10 are within certain ranges. At step 340, the input speed IS and output speed OS of automatic transmission 10 are compared to various criterion speeds. Electronic control unit 28 may establish whether the input speed IS of automatic transmission 10 is greater or less than a criterion input speed, TIS, at step 340. Electronic control unit 28 may also establish whether the output speed OS of automatic transmission 10 is greater or less than a criterion output speed, TOS, at step 340.

The criterion input speed TIS may be any suitable speed or function of the output speed measured at step 330. For example, the criterion input speed TIS may be about (e.g., within ten percent of) equal to the output speed OS of automatic transmission 10 from step 320 or a product of the output speed OS of automatic transmission 10 from step 320 and a gear ratio of automatic transmission 10, such as the fourth gear ratio, 1.382. The criterion output speed TOS may be any suitable speed. For example, the criterion output speed TOS may be less than five hundred rotations per minute (RPM), less than one hundred rotations per minute (RPM), less than fifty rotations per minute (RPM), etc.

At step 350, a first process is used to synchronize the positive shifting element of automatic transmission 10 if the input speed IS of automatic transmission 10, e.g., from step 320, is less than the criterion input speed TIS at step 340. The first process includes increasing the input speed IS of automatic transmission 10 via torque management. Thus, as an example, an engine speed of an associated vehicle may be increased in order increase the speed of turbine 44 of torque coupling 40. When the input speed IS of automatic transmission 10 is less than the output speed OS of automatic transmission 10, increasing the engine speed of the associated vehicle turns impeller 42 of torque coupling 40 faster thereby increasing the input speed IS of automatic transmission 10. By increasing the input speed IS of automatic transmission 10 via torque management, the positive shifting element of automatic transmission 10, such as dog clutch F, may be synchronized at step 350.

After step 350, the positive shifting element of automatic transmission 10 may be commanded to the engaged configuration. In such a manner, the positive shifting element of automatic transmission 10 may be synchronized and actuated to the engaged configuration when the input speed IS of automatic transmission 10 is less than the criterion input speed TIS at step 340. With dog clutch F engaged, automatic transmission 10 may also be placed into fourth gear, e.g., by actuating multidisc clutch E to the engaged configuration, as shown in FIG. 2.

At step 360, a second process is used to synchronize the positive shifting element of automatic transmission 10 if the input speed IS of automatic transmission 10, e.g., from step 320, is greater than the criterion input speed TIS at step 340 and the output speed OS of automatic transmission 10, e.g., from step 330, is greater than the criterion output speed TOS at step 340. The second process includes shifting the automatic transmission 10 to an initial gear and downshifting the automatic transmission 10 from the initial gear to a subsequent gear. The positive shifting element of automatic transmission 10 is commanded to the disengaged configuration in the initial gear. Conversely, the positive shifting element of automatic transmission 10 is commanded to the engaged configuration in the subsequent gear. The initial gear may be any suitable gear of automatic transmission 10. For example, the initial gear may be the fifth gear of automatic transmission 10, as shown in FIG. 2. The subsequent gear may also be any suitable gear of automatic transmission 10. For example, the subsequent gear may be the first gear, the second gear, the third gear, or the fourth gear of automatic transmission 10, as shown in FIG. 2. As an example, step 360 may be performed in a similar manner to the method described in U.S. Patent Publication 2012/0029778 of Arnold et al., which is hereby incorporated by reference for all purposes.

By shifting automatic transmission 10 to the initial gear during the second process, the positive shifting element of automatic transmission 10, such as dog clutch F, may be synchronized at step 360. In particular, shifting automatic transmission 10 to the initial gear may decrease a speed differential of dog clutch F and synchronize dog clutch F at step 360. After step 360, the positive shifting element of automatic transmission 10 may be commanded to the engaged configuration, e.g., during the downshift to the subsequent gear. In such a manner, the positive shifting element of automatic transmission 10 may be synchronized and actuated to the engaged configuration when the input speed IS of automatic transmission 10 is greater than the criterion input speed TIS at step 340 and the output speed OS of automatic transmission 10 is greater than the criterion output speed TOS at step 340.

At step 370, a third process is used to synchronize the positive shifting element of automatic transmission 10 if the input speed IS of automatic transmission 10, e.g., from step 320, is greater than the criterion input speed TIS at step 340 and the output speed OS of automatic transmission 10, e.g., from step 330, is less than the criterion output speed TOS at step 340. The third process includes closing a first non-positive shifting element, such as multidisc brake C, of automatic transmission 10 to the engaged configuration and actuating a second non-positive shifting element, such as multidisc brake D, of automatic transmission 10 to a touch point of the second non-positive shifting element. By closing multidisc brake C and bringing multidisc brake D to its touch point, dog clutch F may be synchronized and actuated to the engaged configuration at step 370. Step 370 may be performed in a similar manner to the method described in U.S. patent Ser. No. 14/512,502 of Schmidt et al., which is hereby incorporated by reference for all purposes.

By selecting between the first process, the second process and the third process for synchronizing the positive shifting element of automatic transmission 10, method 300 may assist with providing a smooth and/or quick actuation between the disengaged configuration and the engaged configuration, e.g., while an associated vehicle is moving. In particular, method 300 may assist with smoothly and/or quickly actuating the positive shifting element of automatic transmission 10 at various input speeds and output speeds of automatic transmission 10. It should be understood that while described in the context of automatic transmission 10, method 300 may be used in or with any suitable automatic transmission in order to smoothly and/or quickly engage a positive shifting element of the automatic transmission.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an automatic transmission, the automatic transmission having a plurality of non-positive shifting elements and at least one positive shifting element, the method comprising:
    measuring an input speed of the automatic transmission and an output speed of the automatic transmission; and
    synchronizing a first positive shifting element of the at least one positive shifting element with: (1) a first process if the input speed of the automatic transmission is less than a criterion input speed at said step of measuring; (2) a second process if the input speed of the automatic transmission is greater than the criterion input speed at said step of measuring and the output speed of the automatic transmission is greater than a criterion output speed at said step of measuring; or (3) a third process if the input speed of the automatic transmission is greater than the criterion input speed at said step of measuring and the output speed of the automatic transmission is less than the criterion output speed at said step of measuring;
    wherein the first process comprises increasing the input speed of the automatic transmission via torque management;
    wherein the second process comprises shifting the automatic transmission to an initial gear and downshifting the automatic transmission to a subsequent gear after said step of shifting, the first positive shifting element of the at least one positive shifting element commanded to a disengaged configuration in the initial gear, the first positive shifting element of the at least one positive shifting element commanded to an engaged configuration in the subsequent gear; and
    wherein the third process comprises closing a first non-positive shifting element of the plurality of non-positive shifting elements and actuating a second non-positive shifting element of the plurality of non-positive shifting elements to a touch point of the second non-positive shifting element.

2. The method of claim 1, wherein said step of measuring comprises receiving a signal from an input speed sensor of the automatic transmission and receiving a second from an output speed sensor of the automatic transmission, the signal from the input speed sensor corresponding to the input speed of the automatic transmission, the signal from the output speed sensor corresponding to the output speed of the automatic transmission.

3. The method of claim 2, wherein the input speed sensor is positioned adjacent a turbine of a torque coupling, the input speed sensor configured for measuring in the speed of the turbine of the torque coupling.

4. The method of claim 3, wherein the first process comprises increasing an engine speed of an associated vehicle in order increase the speed of the turbine of the torque coupling.

5. The method of claim 1, wherein the criterion input speed corresponds to a product of the measured output speed and a gear ratio of the automatic transmission in fourth gear.

6. The method of claim 1, wherein a speed differential of the first positive shifting element decreases during said step of synchronizing.

7. The method of claim 6, wherein the speed differential of the first positive shifting element decreases during the first process, the second process, and the third process.

8. The method of claim 1, further comprising commanding the first positive shifting element to the engaged configuration after said step of synchronizing.

9. A method for operating a nine-speed automatic transmission, the nine-speed automatic transmission including a friction shifting element C, a friction shifting element D, a friction shifting element E, and a dog clutch F, the method comprising:
    measuring an input speed of the automatic transmission and an output speed of the automatic transmission; and
    synchronizing the dog clutch F with: (1) a first process if the input speed of the automatic transmission is less than a criterion input speed at said step of measuring; (2) a second process if the input speed of the automatic transmission is greater than the criterion input speed at said step of measuring and the output speed of the automatic transmission is greater than a criterion output speed at said step of measuring; or (3) a third process if the input speed of the automatic transmission is greater than the criterion input speed at said step of measuring and the output speed of the automatic transmission is less than the criterion output speed at said step of measuring;
    wherein the first process comprises increasing the input speed of the automatic transmission via torque management;
    wherein the second process comprises shifting the automatic transmission to an initial gear and downshifting the automatic transmission to a subsequent gear after said step of shifting, the dog clutch F commanded to a disengaged configuration in the initial gear, the dog clutch F commanded to an engaged configuration in the subsequent gear; and
    wherein the third process comprises closing the friction shifting element C and actuating the friction shifting element D to a touch point of the friction shifting element D.

10. The method of claim 9, wherein said step of measuring comprises receiving a signal from an input speed sensor of the automatic transmission and receiving a second from an output speed sensor of the automatic transmission, the signal from the input speed sensor corresponding to the input speed of the automatic transmission, the signal from the output speed sensor corresponding to the output speed of the automatic transmission.

11. The method of claim 9, wherein the input speed sensor is positioned adjacent a turbine of a torque coupling, the input speed sensor configured for measuring in the speed of the turbine of the torque coupling.

12. The method of claim 9, wherein the first process comprises increasing an engine speed of an associated vehicle in order increase the speed of the turbine of the torque coupling.

13. The method of claim 9, wherein the criterion input speed corresponds to a product of the measured output speed and a gear ratio of the automatic transmission in fourth gear.

14. The method of claim 9, wherein a speed differential of the first positive shifting element decreases during said step of synchronizing.

15. The method of claim 9, wherein the speed differential of the first positive shifting element decreases during the first process, the second process, and the third process.

16. The method of claim 9, further comprising commanding the dog clutch F to the engaged configuration after said step of synchronizing.

17. The method of claim 9, wherein the subsequent gear is a first gear, a second gear, a third gear or a fourth gear of the automatic transmission.

18. The method of claim 9, wherein the initial gear is a fifth gear of the automatic transmission.

19. A method for operating an automatic transmission, the automatic transmission having a plurality of non-positive shifting elements and at least one positive shifting element, the method comprising:

measuring an input speed of the automatic transmission and an output speed of the automatic transmission;

step for synchronizing a first positive shifting element of the at least one positive shifting element if the input speed of the automatic transmission is less than a criterion input speed at said step of measuring;

step for synchronizing the first positive shifting element of the at least one positive shifting element if the input speed of the automatic transmission is greater than the criterion input speed at said step of measuring and the output speed of the automatic transmission is greater than a criterion output speed at said step of measuring; and step for synchronizing the first positive shifting element of the at least one positive shifting element if the input speed of the automatic transmission is greater than the criterion input speed at said step of measuring and the output speed of the automatic transmission is less than the criterion output speed at said step of measuring.

\* \* \* \* \*